US012120089B2

(12) United States Patent
Weber

(10) Patent No.: US 12,120,089 B2
(45) Date of Patent: Oct. 15, 2024

(54) SYSTEM FOR EVENT-DRIVEN REDIRECTION OF INTERNET PROTOCOL SERVICE FLOWS

(71) Applicant: Buckeye Cablevision Inc., Northwood, OH (US)

(72) Inventor: Brian J. Weber, Toledo, OH (US)

(73) Assignee: Buckeye Cablevision Inc., Northwood, OH (US)

( * ) Notice: Subject to any disclaimer, the term of this patent is extended or adjusted under 35 U.S.C. 154(b) by 0 days.

(21) Appl. No.: 18/467,369

(22) Filed: Sep. 14, 2023

(65) Prior Publication Data
US 2024/0007433 A1 Jan. 4, 2024

Related U.S. Application Data

(63) Continuation of application No. 16/919,482, filed on Jul. 2, 2020, now Pat. No. 11,805,095.
(Continued)

(51) Int. Cl.
*H04L 61/5053* (2022.01)
*H04L 12/66* (2006.01)
(Continued)

(52) U.S. Cl.
CPC ......... *H04L 61/5014* (2022.05); *H04L 12/66* (2013.01); *H04L 61/4511* (2022.05); *H04L 61/5053* (2022.05); *H04L 2101/622* (2022.05)

(58) Field of Classification Search
CPC ............. H04L 61/5014; H04L 61/5053; H04L 61/4511; H04L 12/66; H04L 2102/622
See application file for complete search history.

(56) References Cited

U.S. PATENT DOCUMENTS

| 8,537,676 B1 | 9/2013 | Apte et al. |
| 8,650,495 B2 | 2/2014 | Ong |

(Continued)

FOREIGN PATENT DOCUMENTS

EP 2211500 B1 1/2016

OTHER PUBLICATIONS

Canadian Patent Office; Examination Search Report dated Jul. 9, 2021; cited in Canadian Patent Application No. 3,085,607; "System for Event-Driven Redirection of Internet Protol Service Flows", 4 pages.

*Primary Examiner* — Ryan J Jakovac
(74) *Attorney, Agent, or Firm* — Shumaker, Loop & Kendrick, LLP; Patrick B. Horne

(57) ABSTRACT

A system provides for event-driven redirection of IP service flows and receives an add event that triggers revectoring of all network traffic that use an Internet gateway that directs all network traffic to unfettered Internet access; provides a new lease for a specified address; transmits, to the Internet gateway, new instructions; the Internet gateway redirects all network traffic originating from the Internet gateway to a specified destination corresponding to an advertisement content server that presents a predetermined amount of advertisement content; receives a remove event corresponding to the specified address; provides a new lease for the specified address; and transmits second new instructions corresponding to values existing prior to the redirection of all network traffic to the specified destination, thereby directing all of the network traffic originating from the Internet gateway back to unfettered Internet access.

16 Claims, 5 Drawing Sheets

Related U.S. Application Data

(60) Provisional application No. 62/870,220, filed on Jul. 3, 2019.

(51) Int. Cl.
*H04L 61/4511* (2022.01)
*H04L 61/5014* (2022.01)
*H04L 101/622* (2022.01)

(56) References Cited

U.S. PATENT DOCUMENTS

| | | |
|---|---|---|
| 9,166,949 B2 | 10/2015 | Kumar et al. |
| 9,438,630 B2 | 9/2016 | Guevin et al. |
| 9,742,811 B2 | 8/2017 | Lemon et al. |
| 10,868,724 B2 | 12/2020 | Rzezak et al. |
| 11,805,095 B2 | 10/2023 | Weber |

System for an event driven re-direction of IP service flows

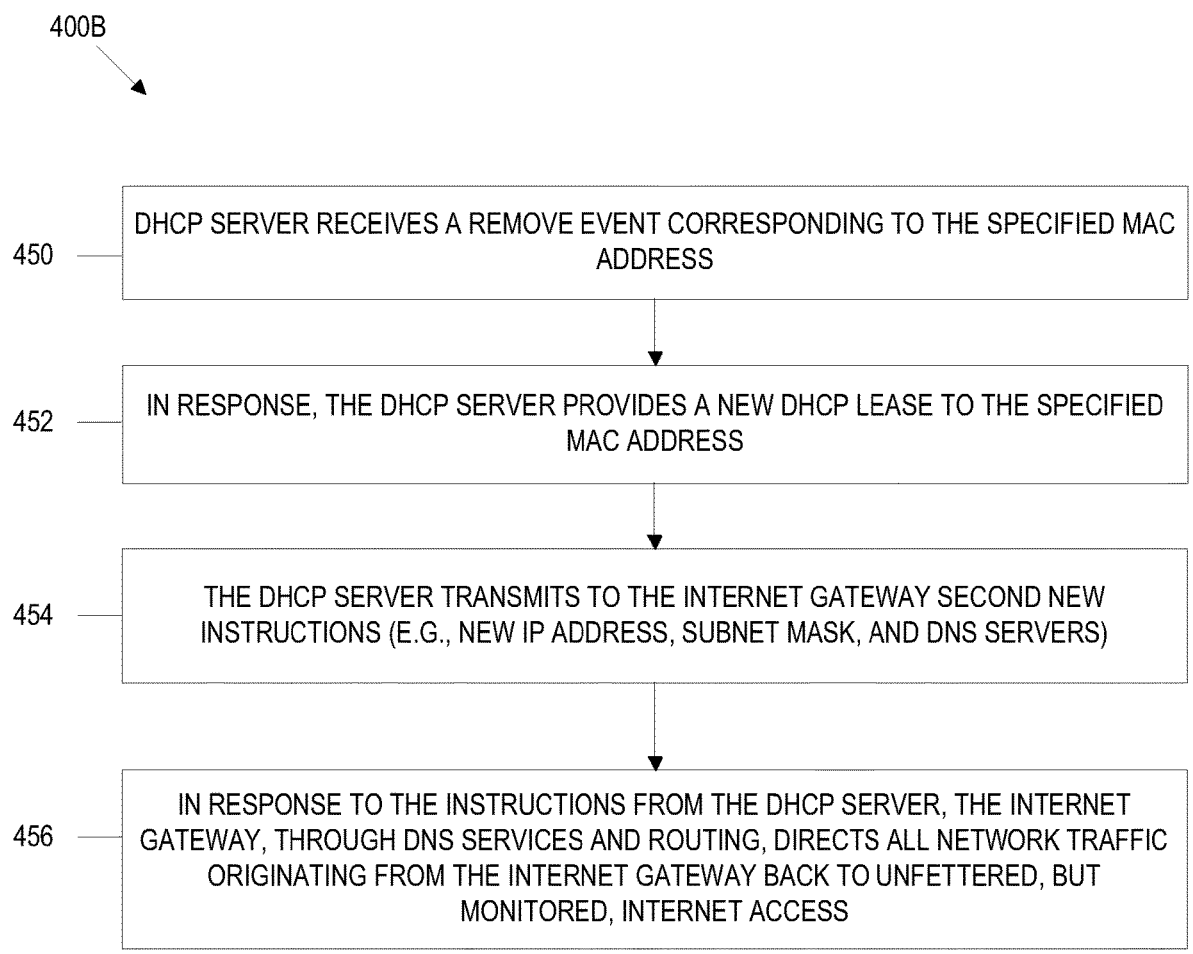

SYSTEM FOR EVENT-DRIVEN REDIRECTION OF INTERNET PROTOCOL SERVICE FLOWS

CROSS-REFERENCE TO RELATED APPLICATIONS

This application claims priority to and benefit of co-pending U.S. patent application Ser. No. 16/919,482, filed on Jul. 2, 2020, entitled "SYSTEM FOR EVENT-DRIVEN REDIRECTION OF INTERNET PROTOCOL SERVICE FLOWS," which traces priority to and claims benefit of U.S. Provisional Application No. 62/870,220, filed on Jul. 3, 2019, entitled "SYSTEM FOR EVENT-DRIVEN REDIRECTION OF INTERNET PROTOCOL SERVICE FLOWS," the entire contents of both of which are hereby incorporated herein in by reference.

TECHNICAL FIELD

This invention relates generally to the field of Internet service provisioning, and more particularly embodiments of the invention relate to a system for content supported highspeed data service delivery independent of media delivery mechanisms.

BACKGROUND

Internet service providers, cable companies, and other telecommunications organizations create infrastructure to provide high speed data connections for end users—both businesses and residential customers. In some situations, access to such a service is expensive and can represent a significant expense to a family. Accordingly, what is needed is a system for providing high-speed data service delivery independent of media delivery mechanisms.

BRIEF SUMMARY

Embodiments of the present invention address the above needs and/or achieve other advantages by providing apparatuses (e.g., a system, computer program product, and/or other devices) and methods that provide high-speed data service delivery independent of media delivery mechanisms in response to a user's viewing of content or performing some other triggering action.

Embodiments of the present invention disclose systems and methods for event-driven redirection of Internet protocol (IP) service flows. A DHCP server for event-driven redirection of Internet protocol (IP) service flows includes a memory device; and a processing device operatively coupled to the memory device, wherein the processing device is configured to execute computer-readable program code to receive an add event corresponding to a specified media access control (MAC) address; in response, provide a new DHCP lease for the specified MAC address; transmit, to an Internet gateway, new instructions comprising one or more of a new IP address, subnet mask, and specified DNS servers; and wherein the Internet gateway, in response to the new instructions, through DNS services and routing, redirects all network traffic originating from the Internet gateway to a specified destination.

In some embodiments, the processing device is further to receive a remove event corresponding to the specified MAC address; in response, provide a second new DHCP lease for the specified MAC address; transmit, to an Internet gateway, second new instructions comprising one or more of a second new IP address, second subnet mask, and second specified DNS servers; and wherein the Internet gateway, in response to the second new instructions, through DNS services and routing, directs all network traffic originating from the Internet gateway back to unfettered, but monitored, Internet access.

In some embodiments, a method according to embodiments of the invention, includes receiving, by a DHCP server, an add event corresponding to a specified media access control (MAC) address; in response, providing, by the DHCP server, a new DHCP lease for the specified MAC address; transmitting, by the DHCP server and to an Internet gateway, new instructions comprising one or more of a new IP address, subnet mask, and specified DNS servers; and, in response to the new instructions, through DNS services and routing, redirecting, by the Internet gateway, all network traffic originating from the Internet gateway to a specified destination.

In some such embodiments, the method also includes receiving, by the DHCP server, a remove event corresponding to the specified MAC address; in response, providing, by the DHCP server, a second new DHCP lease for the specified MAC address; transmitting, by the DHCP server, to an Internet gateway, second new instructions comprising one or more of a second new IP address, second subnet mask, and second specified DNS servers; and, in response to the second new instructions, through DNS services and routing, directing, by the Internet gateway, all network traffic originating from the Internet gateway back to unfettered, but monitored, Internet access.

The features, functions, and advantages that have been discussed may be achieved independently in various embodiments of the present invention or may be combined in yet other embodiments, further details of which can be seen with reference to the following description and drawings.

BRIEF DESCRIPTION OF THE SEVERAL VIEWS OF THE DRAWINGS

Figure 1:
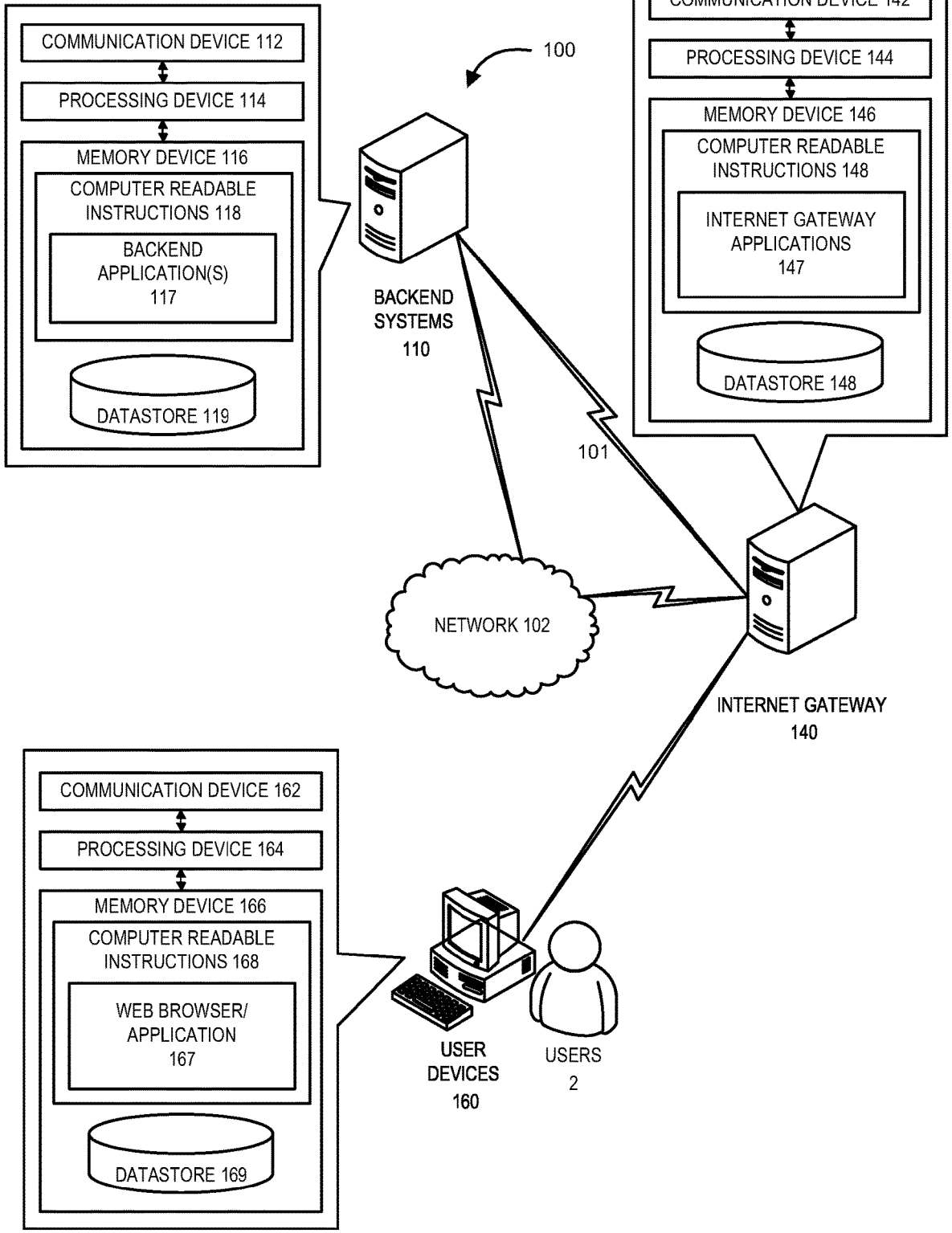
Figure 2:
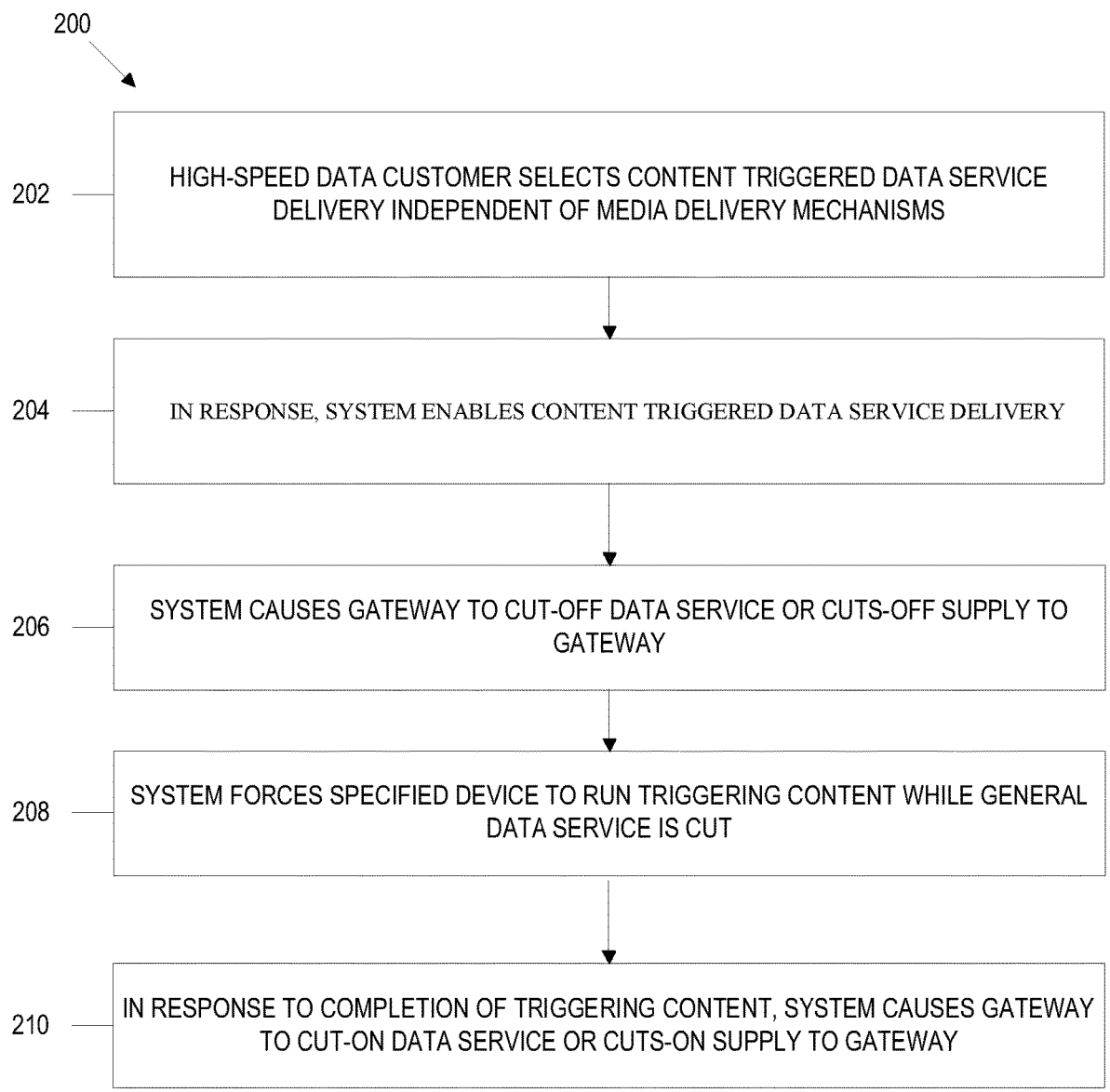
Figure 3:
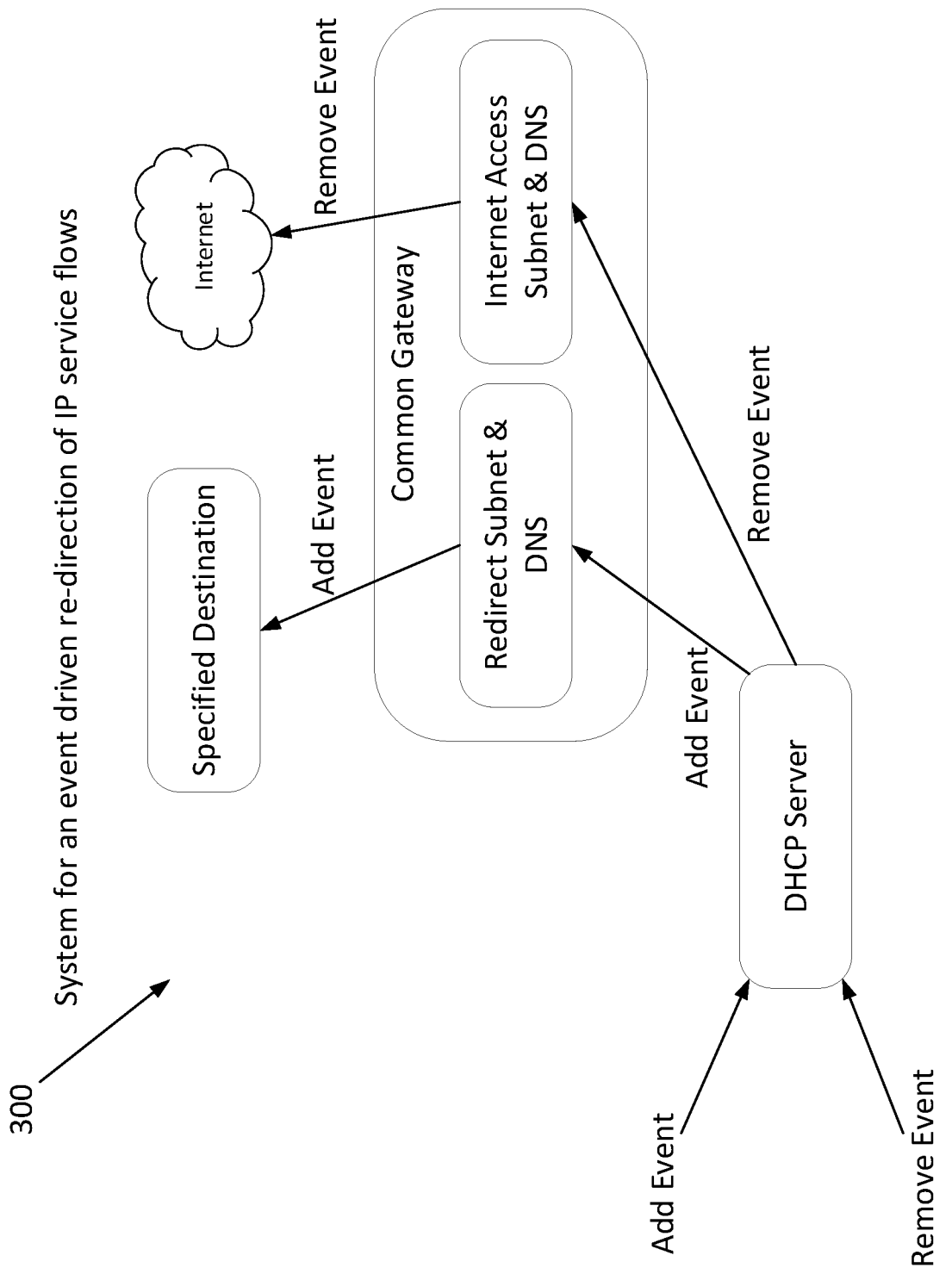
Figure 4A:
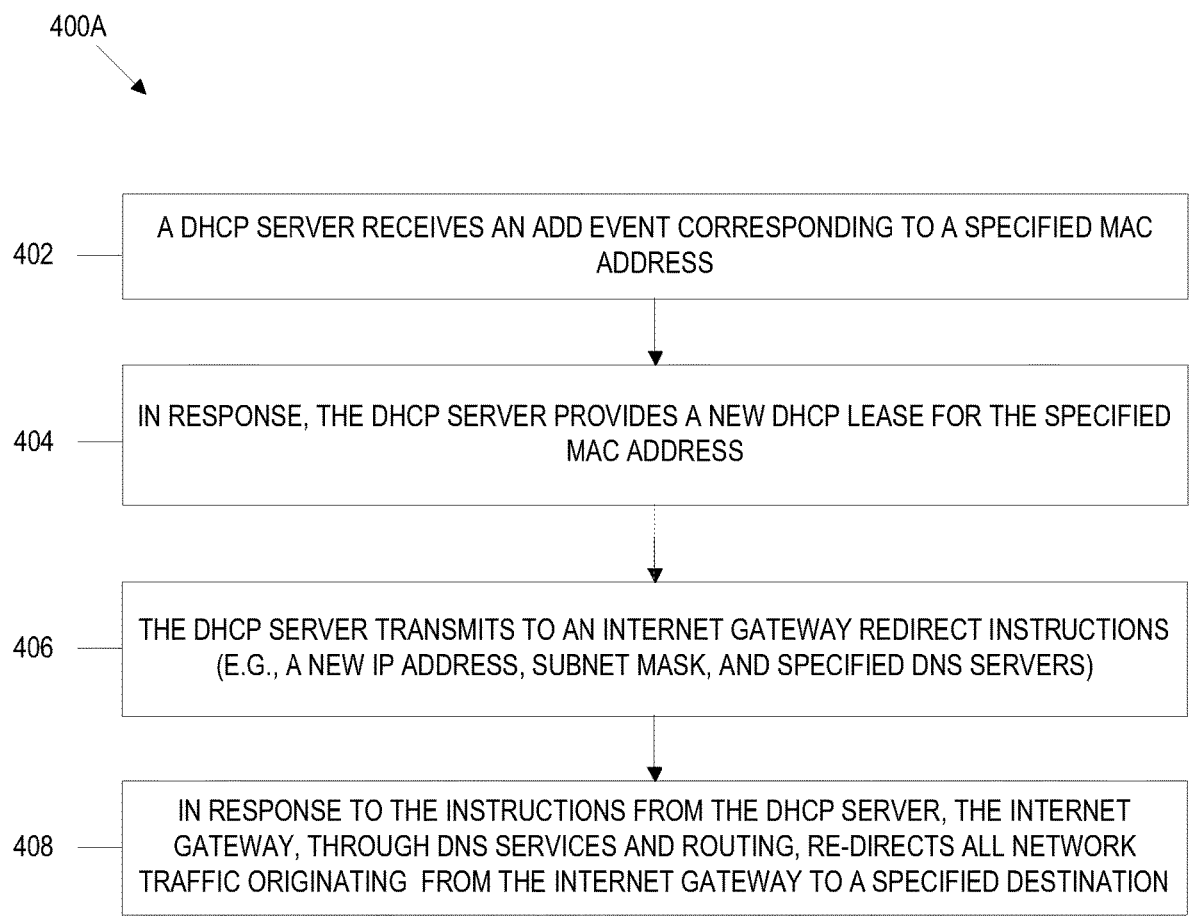

Having thus described embodiments of the invention in general terms, reference will now be made to the accompanying drawings, wherein:

FIG. 1 illustrates an environment in which systems operate according to embodiments of the invention;

FIG. 2 is a flowchart illustrating a method for content triggered high-speed data service delivery according to embodiments of the present invention;

FIG. 3 is a combined flowchart and block diagram illustrating methods and systems according to embodiments of the present invention; and FIGS. 4A and 4B are flowcharts illustrating methods for event-driven re-direction of IP service flows according to embodiments of the invention.

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to like elements throughout.

Previous content (e.g., advertisement) delivery systems exist for specific types of applications (HULU, YouTube, FaceBook, Boingo, etc.). The systems represented by embodiments of the present invention are non-specific and will re-direct Internet and high speed data traffic without regard to application or device. The re-direction function is triggered through configurable parameters within this platform. The platform consists of a combination of proprietary software written for this application that controls all aspects of the management of customer/subscriber data traffic in a closed service provider data network.

WIFI captive proxy systems used by Boingo, RaGaPa, and ALEPO use a subset of this method, but do so for public paid subscription Internet access for wireless 802.11 network access only. These systems allow only one path from the subscriber to the Internet through a proxy server. This system leverages the aforementioned playback system only (similar to a Blu-ray player) and manipulates data network IP router traffic to connect and disconnect the customer/subscriber from the playback system for the purpose of viewing advertisements.

The present invention relates to an integration of previously existing, and some newly created subsystems that facilitate the delivery of a non-fee based, content (e.g., advertisement) supported high speed Internet service product. The system is capable of being integrated with a service operator's existing billing system platform to provision, maintain and support a customer/subscriber's Internet access. The system is designed to provide this service independent of the technical delivery mechanism, and currently provides service over wired (copper and coaxial cable), fiber optic and wireless delivery systems.

This invention can be used with any existing high speed data network and Internet access system, without regard to delivery mechanism, and without the need to alter infrastructure through the use of proxy servers. It can be used and controlled by any billing system platform as well through the use of Application Program Interfaces (APIs).

The immediate use of the invention will be to provide ubiquitous Internet access for those customers/Subscribers who cannot afford a standard monthly fee. The system will be supported by funding gained through the dissemination of paid advertising revenue. This will open access to 100% of connected households within the existing service provider area. This ostensibly provides "free" Internet service for those who cannot otherwise afford it.

Accordingly, embodiments of the present invention disclose a system for content triggered high-speed data service delivery independent of media delivery mechanisms. The system and/or service described herein may be referred to as the content triggered system or service (CTS). A backend system receives instructions from high-speed data customer indicating a selection of content triggered data service delivery; in response to receiving the instructions, enables content triggered data service delivery; (i) causes a gateway to cut-off HSD service or (ii) cuts-off supply to the gateway; causes a specified device connected to the gateway on its customer side to run a triggering content; and, in response to completion of running of the triggering content on the specified device, (i) causes the gateway to cut-on HSD service for the customer, or (ii) cutting on HSD service to the gateway and customer.

Referring now to FIG. 1, a data service environment 100 in which systems operate according to embodiments of the invention. The data service environment 100, in accordance with an embodiment of the present invention. As illustrated in the data service environment 100 of FIG. 1, the user devices 160 are operatively coupled, via an Internet gateway 140, and either (i) through the network 102 or directly (or indirectly) through connection 101 to the backend systems 110, and/or other systems of an entity, such as an Internet service provider (ISP). The ISP provides data services for end users in such a configuration through the Internet gateway 140. In this way, the user 2 may utilize the user devices 160 to access the Internet through the Internet gateway 140. FIG. 1 illustrates only one example of embodiments of a data service environment 100, and it will be appreciated that in other embodiments one or more of the systems (e.g., computers, mobile devices, servers, or other like systems) may be combined into a single system or be made up of multiple systems.

The network 102 may be a global area network (GAN), such as the Internet, a wide area network (WAN), a local area network (LAN), or any other type of network or combination of networks. The network 102 may provide for wireline, wireless, or a combination of wireline and wireless communication between devices on the network.

As illustrated in FIG. 1, the user devices 160 may include a communication device 162, a processing device 164, and a memory device 166. As used herein, the term "processing device" generally includes circuitry used for implementing the communication and/or logic functions of a particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 164 is operatively coupled to the communication device 162 and the memory device 166. The processing device 164 uses the communication device 162 to communicate, via the Internet gateway 140 with the network 102 and other devices on the network 102, such as, but not limited to, the backend systems 110 and/or other devices, servers, systems or the like. As such, the communication device 162 generally comprises a modem, server, WiFi capabilities, Bluetooth capabilities, or other device for communicating with the Internet gateway 140, and a display, camera, keypad, touchpad, mouse, keyboard, microphone, and/or speakers for communicating with one or more users 102. The user devices 160 may be or include, for example, a personal computer, a laptop, a mobile device (e.g., phone, smartphone, tablet, or the like), Internet of things (IOT) devices, connected devices, smart home devices, or other like devices whether or not the devices are mentioned within this specification. In some embodiments, the user devices 160 could include a data capture device that is operatively coupled to the communication device 162, processing device 164, and the memory device 166. The data capture device could include devices such as, but not limited to a location determining device, such as a radio frequency identification ("RFID") device, a global positioning satellite ("GPS") device, Wi-Fi triangulation device, or the like, which can be used by a user 2, institution, or the like to capture information from a user 2, such as but not limited to the location of the user 2.

As further illustrated in FIG. 1, the user devices 160 include computer-readable instructions 168 stored in the memory device 166, which in one embodiment includes the computer-readable instructions 168 of a web browser/application 167. In some embodiments, the memory device 166 includes a datastore 169 for storing data related to the user devices 160, including but not limited to data created and/or used by the web browser/application 167. As discussed above the web browser/application 167 allows the users 2 to interact over the Internet through the Internet gateway 140.

As further illustrated in FIG. 1, the backend systems 110 generally include a communication device 112, a processing device 114, and a memory device 116. The processing device 114 is operatively coupled to the communication device 112 and the memory device 116. The processing device 114 uses the communication device 112 to communicate with the network 102, and other devices on the network 102, such as, but not limited to, the user devices 160 through the Internet gateway 140. As such, the communication device 112 generally comprises a modem, server, WiFi capabilities, Bluetooth capabilities or other device(s) for communicating with other systems on the network 102 (i.e., the Internet).

As illustrated in FIG. 1, the backend systems 110 also may include computer-readable program instructions 118 stored in the memory device 116, which in one embodiment includes the computer-readable instructions 118 of a backend application 117. In some embodiments, the memory device 116 includes a datastore 119 for storing data related to the backend systems 110, including but not limited to data created and/or used by the backend application 117.

The backend system 110 may be or include one or more billing systems, re-direct systems, triggering content (i.e., advertisement) playback systems, and/or the like. Thus, the backend application(s) 117 may be or include one or more billing applications that processes transactions with the user, a device connected to the Internet gateway 140 or otherwise, one or more re-direction applications that re-direct a user's and/or device's interactions over the Internet gateway 140 and/or the network 102, one or more triggering content playback TCP applications, or the like. The TCP application may, in some embodiments, transmit a content file or content packet with instructions to playback the content file. Such a transmission may be sent from the backend system 110 through the Internet gateway 140 to one or more specified user devices 160 for viewing by a user 2. In another embodiment, the TCP application opens a content file or packet, plays the content, and streams the content through the Internet gateway 140 to one or more specified devices 160 for viewing by a user 2. In another embodiment, the TCP application sends content files to the Internet gateway 140 and/or the user devices 160, and in some cases, sends instructions to playback the files immediately or upon occurrence of one or more triggering events.

As further illustrated in FIG. 1, the Internet gateway 140 may include a communication device 142, a processing device 144, and a memory device 146. The processing device 144 is operatively coupled to the communication device 142 and the memory device 146. The processing device 144 uses the communication device 142 to communicate with the network 102, and other devices on the network 102, such as, but not limited to, the backend systems 110, and provides a gateway between the user devices 160 and the network 102. As such, the communication device 142 generally comprises a modem, server, or other devices for communicating with the network 102 and/or backend systems 110. In some embodiments, the Internet gateway is coupled with a cable modem or other device that is connected between the Internet gateway 140 and the network 102 and/or backend systems 110.

As illustrated in FIG. 1, the Internet gateway 140 may include computer-readable program instructions 148 stored in the memory device 146, which in one embodiment includes the computer-readable instructions 148 that may include one or more Internet gateway applications 147. In some embodiments, the memory device 146 includes a datastore 149 for storing data related to the Internet gateway 140, including but not limited to data created and/or used by the Internet gateway applications 147.

Referring now to FIG. 2, a flowchart illustrates a method for content triggered high-speed data service delivery independent of media delivery mechanisms. The first step, as represented by block 202, is that a high-speed data customer selects content triggered data service delivery. Such delivery is independent of media delivery mechanisms. The next step, as represented by block 204, is that the system enables content triggered data service delivery in response to the customer selection. Next, as represented by block 206, in some embodiments, the system causes the gateway to cut-off data service. In other embodiments, the system cuts-off the supply to the gateway. The next step, as represented by block 208, is for the system to force a specified device to run triggering content while general data service is cut. Finally, as represented by block 210, in response to completion of triggering content, the system causes the gateway to cut-on data service in some embodiments. In other embodiments, in response to completion of triggering content playback, the system cuts-on the supply to the gateway.

Event Driven Re-Direction of IP Service Flows

Event or command driven vectoring of IP routed data network traffic is unique with this invention. No software exists that will allow a command to be sent to a router to re-vector IP routed traffic. This invention takes the static OSI layers and makes them dynamic without an overhaul of a carrier's network architecture.

Referring now to FIG. 3, an environment in which systems according to embodiments of the present invention interact is illustrated. Through novel use of the Dynamic Host Configuration Protocol (DHCP) IETF RFC2131, Domain Name System (DNS), IEEE 802.1Q Virtual Local Area Networks, and routing protocols, the new system will enable the re-direct of all network traffic originating from a common gateway to a specified destination based upon a specified event. The common gateway is defined as a specific IEEE 802-2001 Media Access Control (MAC) address.

When an add event occurs for a specified MAC address the DHCP system provides a new DHCP lease to the specified MAC address. The gateway receives a new IP address, subnet mask, and specific DNS servers. Through a combination of DNS services and routing all network traffic originating from the gateway is re-directed to a specified destination.

When a remove event occurs for a specified MAC address the DHCP system provides a new DHCP lease to the specified MAC address. The gateway receives a new IP address, subnet mask, and DNS servers. Through a combination of DNS services, IP addresses, and routing all network traffic originating from the gateway is directed back to unfettered, but monitored, Internet access.

The system can vector, on demand or by using an event trigger, route IP network data flows. This facilitates ad hoc controlled data network access in both residential and commercial environments. Further, this enables the regulation of Internet usage by time, independent of the end application employed by the subscriber, or the physical media used to transport the data to and from the subscriber's end device.

The system regulates high speed data network access for all use conditions such as main screen television/video, web browsing for any device type, Internet phone, security systems or any Internet of Things (IoT) application. The invention works by using a re-direct system based upon IEEE MAC addresses rather than Internet Protocol (IP) addresses and therefore can be used with any version of IP (version 4 or 6) without modification.

Accordingly, embodiments of the invention provide a system for event-driven redirection of Internet protocol service flows. Embodiments receive, by a DHCP server, an add event corresponding to a specified media access control (MAC) address; in response, provide, by the DHCP server, a new DHCP lease for the specified MAC address; transmit, by the DHCP server and to an Internet gateway, new instructions comprising one or more of a new IP address, subnet mask, and specified DNS servers; and, in response to the new instructions, through DNS services and routing, redirecting, by the Internet gateway, all network traffic originating from the Internet gateway to a specified destination. Some embodiments also receive, by the DHCP server, a remove event corresponding to the specified MAC address; in response, provide, by the DHCP server, a second new DHCP lease for the specified MAC address; transmit, by the DHCP server, to an Internet gateway, second new instructions comprising one or more of a second new IP address, second subnet mask, and second specified DNS servers; and, in response to the second new instructions, through DNS services and routing, direct, by the Internet gateway, all network traffic originating from the Internet gateway back to unfettered, but monitored, Internet access.

Referring now to FIG. 4A, a flowchart illustrates a method 400A for event driven redirection of IP service flows according to embodiments of the invention. The first step, as represented by block 402, is that a DHCP server receives an add event corresponding to a specified MAC address. The next step, as represented by block 404, is that, in response to the DHCP server receiving the add event, the DHCP server provides a new DHCP lease for the specified MAC address. Next, as represented by block 406, the DHCP server transmits to an Internet gateway, redirect instructions. The redirect instructions, in some embodiments, may include, for example, a new IP address, subnet mask, and specified DNS servers. Finally, as represented by block 408, in response to the instructions from the DHCP server, the Internet gateway, through DNS services and routing, redirects all network traffic originating from the Internet gateway to a specified destination.

Referring now to FIG. 4B, a flowchart illustrates a method 400B for event driven redirection of IP service flows according to embodiments of the invention. The first step, as represented by block 450, is for a DHCP server to receive a remove event corresponding to the specified MAC address. Next, as represented by block 452, in response to receiving the remove event, the DHCP server provides a new DHCP lease to the specified MAC address. The next step, as represented by block 454, the DHCP server transmits to the Internet gateway, second new instructions. In some embodiments, the second new instructions may include a new IP address, subnet mask and DNS servers. These instructions may correspond, in some cases, to values existing prior to initial redirect in accordance with the redirect method 400A described with reference to FIG. 4A. Finally, as represented by block 456, in response to the instructions from the DHCP server, the Internet gateway, through DNS services and routing, directs all network traffic originating from the Internet gateway back to unfettered, but monitored, Internet access.

It is understood that the systems and devices described herein illustrate one embodiment of the invention. It is further understood that one or more of the systems, devices, or the like can be combined or separated in other embodiments and still function in the same or similar way as the embodiments described herein.

Any suitable computer-usable or computer-readable medium may be utilized. The computer usable or computer readable medium may be, for example but not limited to, an electronic, magnetic, optical, electromagnetic, infrared, or semiconductor system, apparatus, or device. More specific examples (a non-exhaustive list) of the computer-readable medium would include the following: an electrical connection having one or more wires; a tangible medium such as a portable computer diskette, a hard disk, a random access memory (RAM), a read-only memory (ROM), an erasable programmable read-only memory (EPROM or Flash memory), a compact disc read-only memory (CD-ROM), or other tangible optical or magnetic storage device.

Computer program code/computer-readable instructions for carrying out operations of embodiments of the present invention may be written in an object oriented, scripted or unscripted programming language such as Java, Perl, Smalltalk, C++ or the like. However, the computer program code/computer-readable instructions for carrying out operations of the invention may also be written in conventional procedural programming languages, such as the "C" programming language or similar programming languages.

Embodiments of the present invention described above, with reference to flowchart illustrations and/or block diagrams of methods or apparatuses (the term "apparatus" including systems and computer program products), will be understood to include that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a particular machine, such that the instructions, which execute via the processor of the computer or other programmable data processing apparatus, create mechanisms for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer readable memory produce an article of manufacture including instructions, which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions, which execute on the computer or other programmable apparatus, provide steps for implementing the functions/acts specified in the flowchart and/or block diagram block or blocks. Alternatively, computer program implemented steps or acts may be combined with operator or human implemented steps or acts in order to carry out an embodiment of the invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A server for event-driven redirection of Internet Protocol (IP) service flows, wherein an Internet gateway having a specified address directs all network traffic originating from the Internet gateway to unfettered Internet access, the server comprising:
   a memory device; and
   a processing device operatively coupled to the memory device, wherein the processing device is configured to execute computer-readable program code to:
      receive an add event that triggers revectoring of all of the network traffic for all end devices that use the Internet gateway, the add event corresponding to the specified address;
      in response, provide a new lease for the specified address;
      transmit, to the Internet gateway, new instructions; and
      wherein the Internet gateway, in response to the new instructions, redirects all of the network traffic originating from the Internet gateway to a specified destination other than the unfettered Internet access that corresponds to an advertisement content server thereby causing the advertisement content server to present a predetermined amount of advertisement content to all of the network traffic originating from the Internet gateway;
      receive a remove event corresponding to the specified address;
      in response, provide a second new lease for the specified address;
      transmit, to the Internet gateway, second new instructions;
      wherein the second new instructions correspond to values existing prior to the redirection of all of the network traffic originating from the Internet gateway to the specified destination; and
      wherein the Internet gateway, in response to the second new instructions and based on the values existing prior to the redirection, directs all of the network traffic originating from the Internet gateway back to the unfettered Internet access.

2. The server of claim 1, wherein the second new instructions comprise one or more of a second new IP address, second subnet mask, and second specified Domain Name System (DNS) servers.

3. The server of claim 2, wherein all of the network traffic originating from the Internet gateway is directed back to the specified destination and to the unfettered Internet access through DNS services and routing.

4. The server of claim 1, wherein the specified address comprises a media access control (MAC) address.

5. The server of claim 1, wherein the server comprises a Dynamic Host Configuration Protocol (DHCP) server.

6. The server of claim 5, wherein the new lease comprises a new DHCP lease.

7. The server of claim 1, wherein the second new lease comprises a second new DHCP lease.

8. A method for event-driven redirection of Internet Protocol (IP) service flows, the method comprising:
   receiving, by a server, an add event that triggers revectoring of all network traffic for all end devices that use an Internet gateway, the add event corresponding to a specified address of the Internet gateway, the Internet gateway directing all network traffic to unfettered Internet access;
   in response, providing, by the server, a new lease for the specified address;
   transmitting, by the server, new instructions to the Internet gateway; and
   in response to the new instructions, redirecting, by the Internet gateway, all network traffic originating from the Internet gateway to a specified destination other than the unfettered Internet access that corresponds to an advertisement content server, thereby causing the advertisement content server to present a predetermined amount of advertisement content to all of the network traffic originating from the Internet gateway;
   receiving, by the server, a remove event corresponding to the specified address;
   in response, providing, by the server, a second new lease for the specified address;
   transmitting, by the server, second new instructions to the Internet gateway in order to re-unlock the unfettered Internet access through the Internet gateway;
   wherein the second new instructions correspond to values existing prior to the redirection of all of the network traffic originating from the Internet gateway to the specified destination; and
   wherein the Internet gateway, in response to the second new instructions and based on the values existing prior to the redirection, directs all of the network traffic originating from the Internet gateway back to the unfettered Internet access.

9. The method of claim 8, wherein the second new instructions comprise one or more of a second new IP address, second subnet mask, and second specified DNS servers.

10. The method of claim 8, wherein all of the network traffic originating from the Internet gateway is directed back to the unfettered Internet access through DNS services and routing.

11. The method of claim 8, wherein the specified address comprises a media access control (MAC) address.

12. The method of claim 8, wherein the server comprises a Dynamic Host Configuration Protocol (DHCP) server.

13. The method of claim 12, wherein the new lease comprises a new DHCP lease.

14. The method of claim 8, wherein the second new lease comprises a second new DHCP lease.

15. A Dynamic Host Configuration Protocol (DHCP) server for event-driven redirection of Internet Protocol (IP) service flows, the DHCP server comprising:
   a memory device; and
   a processing device operatively coupled to the memory device, wherein the processing device is configured to execute computer-readable program code to:
      receive an add event that triggers revectoring of all network traffic for all end devices that use an Internet gateway, the add event corresponding to a specified Media Access Control (MAC) address of an Internet gateway, the Internet gateway directing all network traffic to unfettered Internet access;

in response, provide a new DHCP lease for the specified MAC address;

transmit new instructions to the Internet gateway; and wherein the Internet gateway, in response to the new instructions, redirects all of the network traffic originating from the Internet gateway to a specified destination corresponding to an advertisement content server, thereby causing the advertisement content server to present a predetermined amount of advertisement content to all of the network traffic originating from the Internet gateway;

receive a remove event corresponding to the specified MAC address;

in response, provide a second new DHCP lease for the specified MAC address;

transmit, to an Internet gateway in order to re-unlock unfettered Internet access through the Internet gateway, second new instructions corresponding to values existing prior to the redirection of all of the network traffic originating from the Internet gateway to the specified destination; and wherein the Internet gateway, in response to the second new instructions, and based on the values existing prior to the redirection, directs all of the network traffic originating from the Internet gateway back to the unfettered Internet access.

16. The server of claim 15, wherein the redirecting of all of the network traffic originating from the Internet gateway to the specified destination corresponding to the advertisement content server enables regulation of Internet usage by time based on the second new instructions being transmitted once the predetermined amount of advertisement content has been presented.

* * * * *